(12) United States Patent
Sikharulidze

(10) Patent No.: US 7,791,706 B2
(45) Date of Patent: Sep. 7, 2010

(54) BISTABLE NEMATIC LIQUID CRYSTAL DISPLAY DEVICE

(75) Inventor: David Sikharulidze, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1311 days.

(21) Appl. No.: 11/075,255

(22) Filed: Mar. 8, 2005

(65) Prior Publication Data

US 2005/0206831 A1      Sep. 22, 2005

(30) Foreign Application Priority Data

Mar. 20, 2004   (GB) ................... 0406327.7

(51) Int. Cl.
  *G02F 1/141*  (2006.01)
  *C09K 19/52*  (2006.01)
  *C09K 19/56*  (2006.01)

(52) U.S. Cl. ............... 349/166; 349/37; 252/299.4

(58) Field of Classification Search ......... 349/163–166, 349/37; 252/299.4
See application file for complete search history.

(56) References Cited

U.S. PATENT DOCUMENTS

| | | | | |
|---|---|---|---|---|
| 4,305,807 A | * | 12/1981 | Somlyody | .................. 349/166 |
| 5,357,358 A | * | 10/1994 | Durand et al. | .............. 349/125 |
| 5,498,762 A | * | 3/1996 | Eguchi | ........................ 428/1.2 |
| 5,729,320 A | * | 3/1998 | Eidenschink et al. | ......... 349/166 |
| 6,987,502 B1 | * | 1/2006 | Kishi et al. | .................. 345/107 |
| 2001/0040651 A1 | * | 11/2001 | Toko | ............................ 349/86 |
| 2002/0135860 A1 | * | 9/2002 | Iwanaga et al. | ............. 359/296 |
| 2002/0191142 A1 | * | 12/2002 | Oguchi et al. | ............... 349/165 |

FOREIGN PATENT DOCUMENTS

| | | | |
|---|---|---|---|
| GB | 2394781 A | | 5/2004 |
| JP | 05061021 A | * | 3/1993 |

OTHER PUBLICATIONS

Barberi et al., Electrochirally controlled bistable surface switching in nematic liquid crystals. Appl. Phys. Lett. 58 (25) Jun. 24, 1991, pp. 2907-2909.*

Search Report dated Jul. 6, 2004.

* cited by examiner

*Primary Examiner*—David Nelms
*Assistant Examiner*—Jessica M Merlin

(57) ABSTRACT

A bistable liquid crystal display device has a nematic liquid crystal which is switchable between two different stable molecular configurations. The liquid crystal has a mixture of finely-divided positively-charged particles and finely-divided negatively-charged particles dispersed therein.

18 Claims, 11 Drawing Sheets

BISTABLE NEMATIC LIQUID CRYSTAL DISPLAY DEVICE

TECHNICAL FIELD

This invention relates to bistable nematic liquid crystal display devices.

CLAIM TO PRIORITY

This application claims priority to copending United Kingdom utility application entitled, "BISTABLE NEMATIC LIQUID CRYSTAL DISPLAY DEVICE," having serial no. GB 0406327.7, filed Mar. 20, 2004, which is entirely incorporated herein by reference.

BACKGROUND

Pixel bistability is a desirable attribute for a liquid crystal display ("LCD") because this eliminates the need constantly to refresh the display or to employ a silicon memory device behind each pixel, which becomes prohibitively expensive as the number of pixels increases. With bistability, only pixels that need to be changed need addressing, and simple matrix addressing may be employed.

Bistable LCDs are known which employ chiral tilted smectic liquid crystals, for example chiral smectic C materials, which exhibit ferroelectricity. However, there are many problems with ferroelectric LCDs, including a paucity of stable, room-temperature materials, wide-temperature-range materials, and structural defects which result from mechanical stress. Because of the problems associated with ferroelectric smectic materials it is desirable to fabricate bistable LCDs using nematic liquid crystals ("LCs").

U.S. Pat. No. 4,333,708 discloses a multistable nematic LC device in which switching between stable configurations is by the movement of disclinations in response to electric fields.

In WO 91/11747 and WO 92/00546 it is proposed to provide a bistable surface by careful control of the thickness and evaporation of SiO coatings. A first stable planar orientation of the director could be obtained, and a second stable orientation in which the director is at an azimuthal angle (in the plane of the surface) of 90° to the first orientation in the plane of the surface, and tilted by around 30°.

In "Mechanically Bistable Liquid-Crystal Display Structures", R N Thurston et al, IEEE Trans. on Elec. Devices, Vol. ED-27, No. 11, November 1980, there are described two bistable nematic LC modes which are called "vertical-horizontal" and "horizontal-horizontal". In the vertical-horizontal mode, both cell walls are treated to give a roughly 45° tilt which permits the directors to be switched between two states in a plane which is perpendicular to the major surfaces of the device. In the horizontal-horizontal mode, the director is switchable between two angles in a plane parallel to the major surfaces of the device.

A bistable nematic display using monostable surface switching has been proposed by I. Dozov et al, *Appl. Phys. Lett.* 70 (9), 1179, 3 Mar. 1997. Switching in a thin cell is achieved between a low twist and a high twist state by the application of short electric pulses. Both cell wall surfaces have planar anchorings. Hydrodynamically coupled breaking of both anchorings results in the high twist state, and breaking only one anchoring results in the low twist state.

Polarity-sensitive switching has been found in a nematic LC-polymer mixture: R. Bartolino et al, J. Appl. Phys. Vol. 85 No. 5, 2870, 1 Mar. 1999. An LC/prepolymer mixture is polymerised in a cell so as to produce a gradient of concentrated polymer across the cell. It is thought that an asymmetric space charge distribution causes asymmetric electro-optical behaviour. A strong negative current produces a scattering (bright) state, and a weak positive current permits a transition to a homeotropic (dark) state.

U.S. Pat. No. 5,796,459 describes the use of a bigrating alignment structure which induces bistable surface states with different azimuthal orientations.

WO 97/14990 and WO 99/34251 describe the use of a monograting surface with a homeotropic local director, which has two stable states with different tilt angles within the same azimuthal plane. The homeotropic alignment is achieved by creating the monograting in a layer of material which causes spontaneous homeotropic orientation or, more practically, by coating the grating surface with a homeotropic inducing alignment agent such as lecithin. This grating surface is used to form a Zenithal Bistable Device or ZBD.

A bistable nematic device is described EP 1 139 151, wherein one cell wall is provided with an array of upstanding features which have a shape and/or orientation to induce the local director to adopt two different tilt angles in substantially the same azimuthal direction. The arrangement is such that two stable molecular configurations can exist after suitable electrical signals have been applied. The features are typically microscopic posts, used to form a Post-Aligned Bistable Nematic device, or PABN.

Typically the depth of gratings or post alignment features of the ZBD or PABN devices is about 1 μm and the ratio depth/width is about 0.6. Gratings this deep are fairly challenging to replicate by mass manufacturing methods.

Bistable nematic displays have been described in which the nematic LC has dispersed in it nanoparticles which are believed to form structures that stabilise the LC in either a scattering state or a homeotropic (non-scattering) state. Switching between the states is achieved either by two-frequency addressing or by the action of a laser. Two frequency-addressable displays are described in: R. Eidenschink, W. H. De Jue "Static scattering in filled nematic: new liquid crystal display technique" *Electronics Letters* 20 Jun. 1991, vol. 27, No. 13, pp 1195-1196, A. Gluschenko et al "Memory effect in filled nematic liquid crystals" *Liquid Crystals,* 1997, vol. 23, No. 2, pp 241-246, and M. Kawasumi et al "Nematic liquid crystal/clay mineral composites" *Minerals Science and Engineering* C6 (1998), pp 135-143. Laser-writable displays are described in U.S. Pat. No. 5,532,952 and M. Kreuzer et al "New liquid crystal display with bistability and selective erasure using scattering in filled nematics" *Appl. Phys. Lett.,* 62(15), 12 Apr. 1993, pp 1712-1714. A study of particle dynamics in such systems is presented in S. Lee et al "Dynamic behaviour of silica particles in liquid crystals under an ac applied voltage" *Proc. of* $13^{th}$ *Intern. Conf. on Dielectric Liquids* (ICDL '99), Nara, Japan, Jul. 20-25, 1999, pp 571-574.

Problems of two-frequency addressing include a paucity of suitable materials and increased complexity of the drive electronics. Laser-writable devices are costly and complex to manufacture, and the use of both heat and voltage to switch the LC is undesirable.

SUMMARY

According to one exemplary embodiment there is provided a bistable nematic liquid crystal display in which the nematic liquid crystal is switchable between two different stable molecular configurations, wherein the liquid crystal has a mixture of finely-divided positively-charged particles and finely-divided negatively-charged particles dispersed therein.

Another embodiment provides a bistable liquid crystal display device comprising:

two cell walls enclosing a layer of a composition comprising nematic liquid crystal material and finely-divided solid particles dispersed therein, at least one of the cell walls being translucent;

at least one electrode on an inner surface of each cell wall for applying an electric field across at least some of said composition;

wherein said finely-divided solid particles comprise a mixture of positively-charged particles and negatively-charged particles;

whereby the nematic liquid crystal material will adopt a first stable molecular configuration in response to a first pulse of a unidirectional electric field of suitable magnitude and duration and will adopt a second stable molecular configuration in response to a second pulse of unidirectional electric field of suitable magnitude and duration and opposite polarity to said first pulse, the second configuration being different from the first configuration and at least one of said first and second configurations being stabilised by the presence of at least some of said charged particles at an inner surface of at least one of said cell walls.

BRIEF DESCRIPTION OF THE DRAWINGS

The invention will now be further described, by way of example only, with reference to the following drawings.

DETAILED DESCRIPTION

Figure 1A:
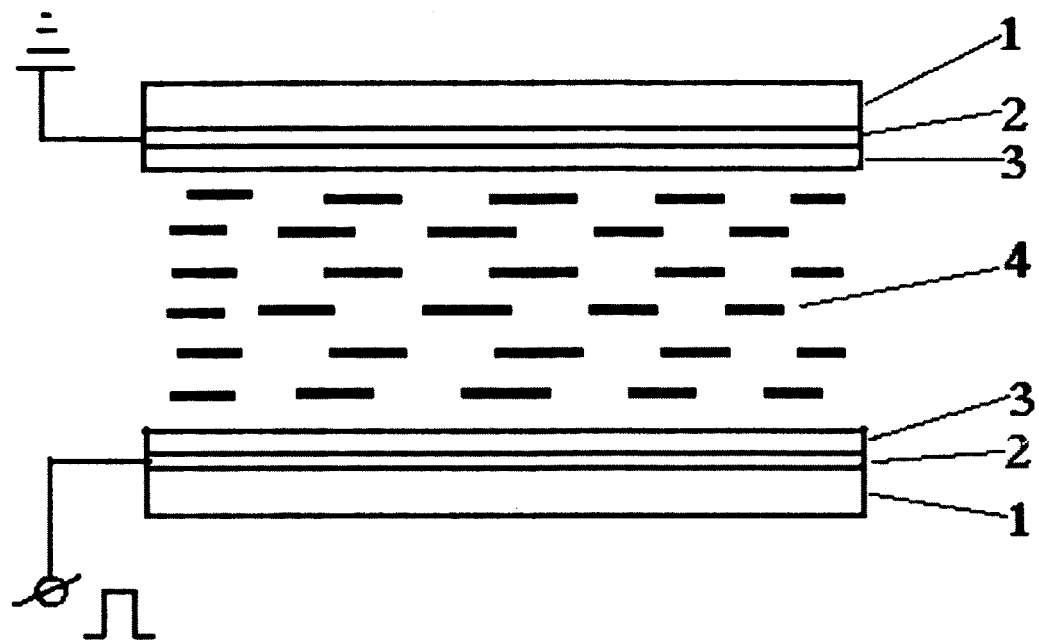
FIG. 1 schematically illustrates bistable LCDs having different alignments in accordance with embodiments of the present invention.

In the following description concentrations are by weight percent (w/w) unless otherwise indicated.

Embodiments provide polarity-controlled switching because of the nature of the interactions between the dispersed particles and the LC molecules and may be applied to LC cells with a range of alignment configurations. Such configurations include planar alignments on both inner surfaces (parallel, antiparallel, or non-parallel), homeotropic alignment on both inner surfaces, bare electrodes, planar alignment on one inner surface and homeotropic alignment on the other inner surface.

Embodiments may include means for optically distinguishing between the first and second molecular configurations. Suitable means are well known from conventional LCD technologies and include, for example: one or more polarisers, or a pleochroic dye dissolved in the liquid crystal, optionally with a polariser. However, the device may be manufactured and sold without means for distinguishing the configurations where means such as polarisers may later be affixed by a purchaser.

The dispersed particles preferably have a size in the range 1 nm to 1000 nm, notably 1 to 500 nm. A particularly preferred size range is 5 to 50 nm. Suitable particles will be referred to herein as nanoparticles. The nanoparticles may be spherical or spheroidal. Because of the small size of the nanoparticles, the observed optical effect is achieved substantially only by a reorientation of the LC molecules. The present invention is thus quite different from electrophoretic displays in which pigment particles in a dyed medium are moved towards or away from a surface so as to display, respectively, the colour of the pigment particles or the colour of the medium.

The nanoparticles, in some embodiments, are present in a concentration of from 0.1 to 25% by weight of the composition. A particularly preferred range is 0.5% to 15%, notably 1 to 5%. With selected embodiments, there are substantially equal numbers of particles of each charge.

The terms "positively-charged" and "negatively-charged" are used herein to denote particles which migrate towards, respectively, a negative electrode and a positive electrode. It is believed that the particles spontaneously acquire a surface charge in suspension in the liquid crystal. However, alternative embodiments would also work with particles that acquire a charge only when acted upon by a unipolar electric field.

We have surprisingly found that the oppositely-charged particles do not significantly form irreversible agglomerates in the LC. Under the influence of a suitable DC electric field each type of charged nanoparticle migrates toward the electrode of opposite sign.

A surface alignment on an inner surface of a cell wall may be covered by nanoparticles which effectively shield LC molecules in the bulk of the cell from the alignment effect. In one embodiment, surface alignments on both cell walls are each shielded by nanoparticles after application of a DC pulse of suitable magnitude and duration.

Thus, for a LC of positive dielectric anisotropy ("positive LC"), one of two stable alignments will be formed, depending on whether the bulk LC molecules are affected by the surface alignments in the absence of an electric field. When a pulse of sufficient magnitude and duration is applied, the LC will align with the nematic director substantially parallel to the electric field (i.e., homeotropic alignment—perpendicular to the planes of the cell inner surfaces). While the pulse is applied, each type of nanoparticle will migrate electrophoretically to the electrode of opposite sign and cover or screen the surface alignments. On removal of the electric field, the LC molecules remain homeotropically aligned because they are unaffected by either surface alignment. Without wishing to be bound by theory, we believe that the homeotropic alignment is also stabilised by a network of nanoparticles located at each surface.

On application of a pulse of opposite polarity, the nanoparticles will be repelled from the electrode surface on which they were disposed and will migrate towards the opposite surface. The electric field is removed before the migration is complete, however, leaving surface alignments at one or both surfaces free to influence bulk alignment of the LC molecules. Hence, the LC adopts a different, non-homeotropic alignment, which is stable in the absence of an applied field.

In the case of a LC of negative dielectric anisotropy ("negative LC"), the surface alignments may induce homeotropic alignment. An applied field causes the nematic director to align in a generally planar state with a range of azimuthal directions. This state appears scattering, or light-absorbing if a pleochroic dye is dissolved in the LC. The planar or scattering state is stabilised if the effect of the surface alignments is masked by the nanoparticles. Application of a suitable electric field pulse will move the nanoparticles from the surfaces and permit the LC to adopt the homeotropic alignment.

We have found that some embodiments even work with bare electrodes. A positive LC is switched to a stable homeotropic alignment by a suitable pulse. A pulse of opposite sign switches the cell to a scattering state which appears light between crossed polarisers or coloured with a dissolved pleochroic dye because of a motion of the nanoparticles in the bulk of the LC. We have also found that a negative LC may be switched between scattering and planar states, although the optical efficiency is relatively low.

Drive electronics may be used to provide unidirectional (DC) pulses of appropriate magnitude, duration and polarity, in accordance with input data information. Suitable drive electronics will be well known to those skilled in the art of electronics. It will be understood that the pulses may be of constant field strength or may have an AC component, providing that the overall field strength is sufficient to effect the switching to a stable state. Any desired addressing arrangement may be employed; for example, a matrix of x electrodes on one cell wall and y electrodes on the other, the electrodes being elongate strips arranged at 90° to each other.

The display device shown in FIG. 1a comprises a pair of opposed transparent cell walls 1. The inner surface of each cell wall 1 is provided with a transparent electrode 2, for example ITO. The cell walls 1 enclose a layer of a composition 4 which comprises a mixture of a nematic liquid crystal and dispersed nanoparticles. In FIG. 1a, and in each of the other drawings of FIG. 1, the orientation of the local nematic director is represented schematically by the long axes of elongate rods in the composition 4. The inner surface of each cell wall 1 is also provided with a thin alignment layer 3, which induces local planar alignment in adjacent molecules of the liquid crystal material. Any planar alignment known to those skilled in the art may be used, for example a rubbed polymer, photoaligned LPP layers, obliquely evaporated SiO, or a grating structure. In the present example, the alignment layer 3 was formed from rubbed polyimide. The alignment orientation of the layers 3 is parallel so that the LC has strong planar alignment. The cell with this planar alignment appears light when viewed between crossed polarisers with the alignment orientation at an intermediate angle (notably 45°) between the polariser orientations, as shown in FIG. 2a.

The composition 4 comprises, in this example, 98% of MLC6440 (a positive LC) doped with 1% of aluminium oxide C and 1% Aerosil® R812 silica.

Figure 2A:
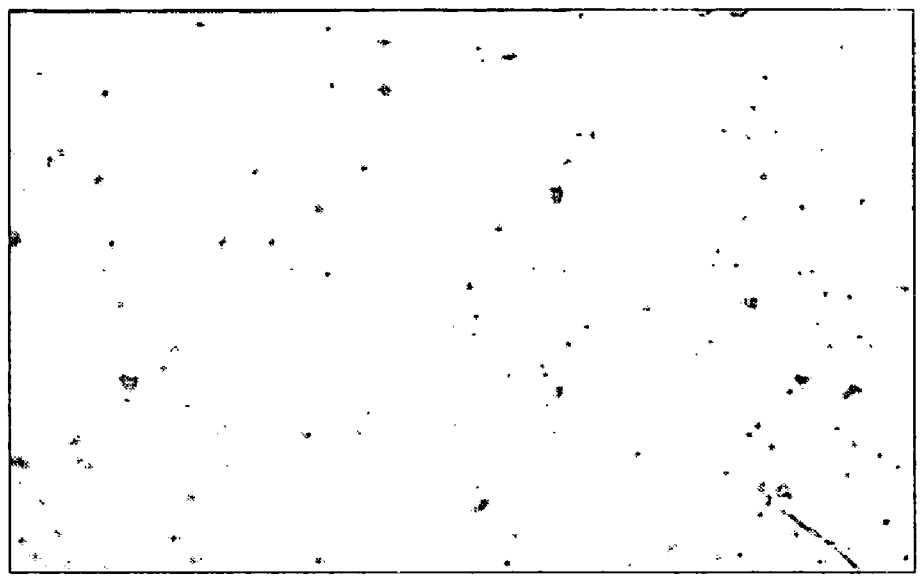
FIG. 2 shows photomicrographs of two stable states of a bistable LCD in accordance with an embodiment of the invention.
Figure 2B:
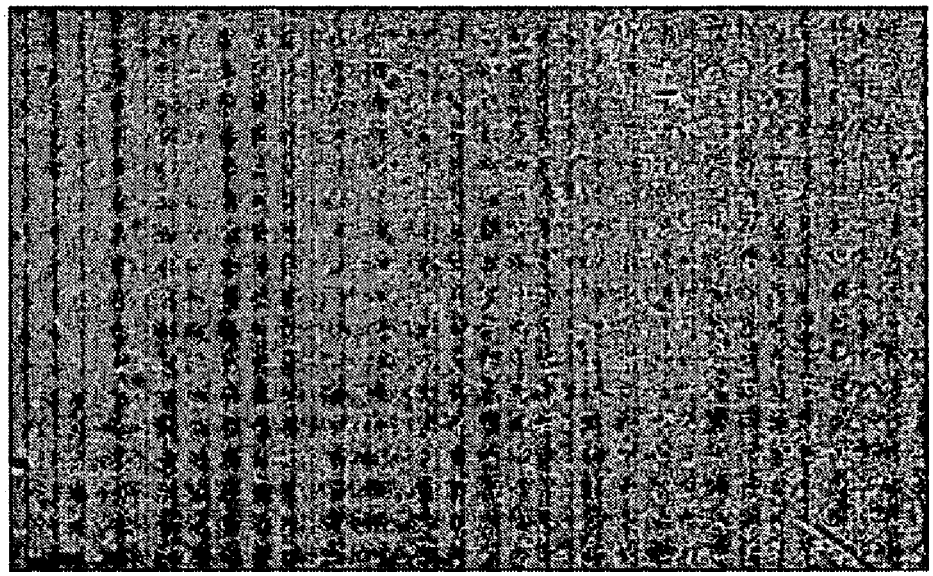

Application of a DC pulse of suitable magnitude and duration causes the LC to align with the electric field and assume a homeotropic (substantially vertical) orientation such as shown in FIG. 1a. The charged nanoparticles migrate to the electrodes 2; the positively-charged aluminium oxide C goes to the negative electrode, and the negatively-charged R812 silica goes to the positive electrode. When sufficient migration has occurred, each of the alignment layers 3 is covered with nanoparticles and no longer influences orientation of the bulk LC in the composition 4. We believe that the nanoparticles form a close-packed network of solid nanoparticles with the vertically-aligned LC molecules close to both cell walls, which maintains this state after removal of the electric field. With the LC molecules remaining homeotropically aligned, the cell appears dark (FIG. 2b) when viewed between crossed polarisers. A further pulse of opposite sign returns the cell to the planar alignment shown in FIG. 1a. In this case, the sign of the electrical pulse polarity coincides with the sign of the charged nanoparticles, which were attracted by the previous pulse to each surface. The sign reversal causes repulsion of the charged nanoparticles from both surfaces, which will be at least partially cleansed of the nanoparticles. This in turn exposes the LC molecules to the strong alignment forces of the layers 3 causing the LC molecules to adopt the planar alignment again.

It should be noted that, for a given pulse length, the amplitude of voltage needed for switching to the stable planar state may be less than that used for the switching to a stable homeotropic state, because the nanoparticles must not migrate all the way from one surface to the other. Preferably the nanoparticles migrate no further than mid-way through the cell. The migration distance can be determined from the expression for electrophoretic drifting under an electrical field $d2=\mu \, tdr \, V$, where $\mu$ is mobility, tdr is drifting time and V=applied voltage. In other words the migration of the nanoparticles can be controlled by the pulse length, which determines the drifting time tdr, and an amplitude of the pulse. The measurement of the electrophoretic migration in the cell with in-plane electrodes gives value of the mobility $\mu \approx 10-6 \, cm2/Vs$. From this we can estimate expected parameters of the electrical pulses and, for example, for the 5 µm cell the electrical pulse 50 V & 5 ms will provide the electromigration of the nanoparticles across whole cell. Respectively, the migration no further than mid cell of both types of nanoparticles will be achieved by reducing a pulse length or amplitude by at least half. So applying of such a pair of pulses with opposite polarity will provide a bistable switching of the cell. The experiments with cells having different geometry give a good confirmation of such a mechanism of switching controlling.

Figure 3A:
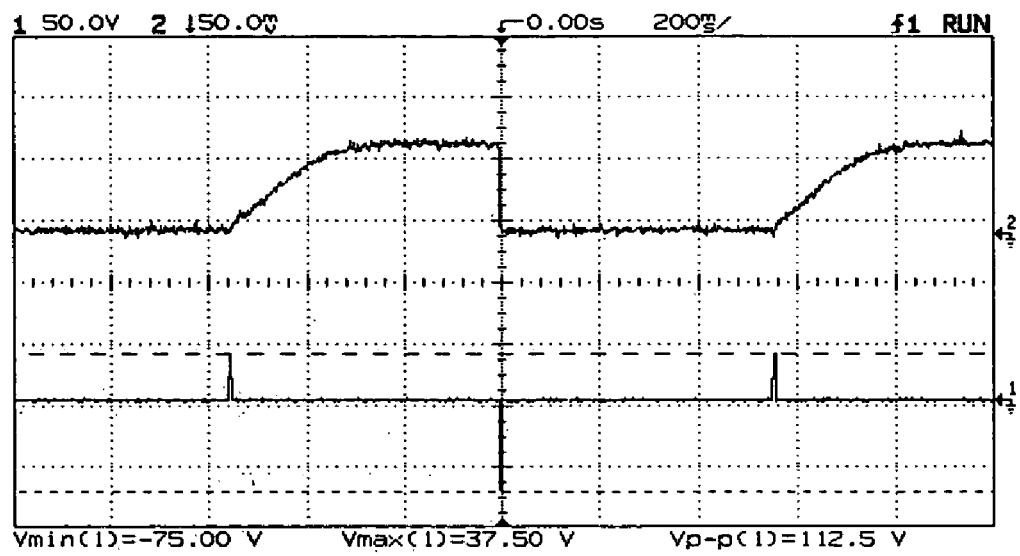
FIG. 3 shows graphs of electro-optical responses for the LCD of FIG. 2.
Figure 3B:
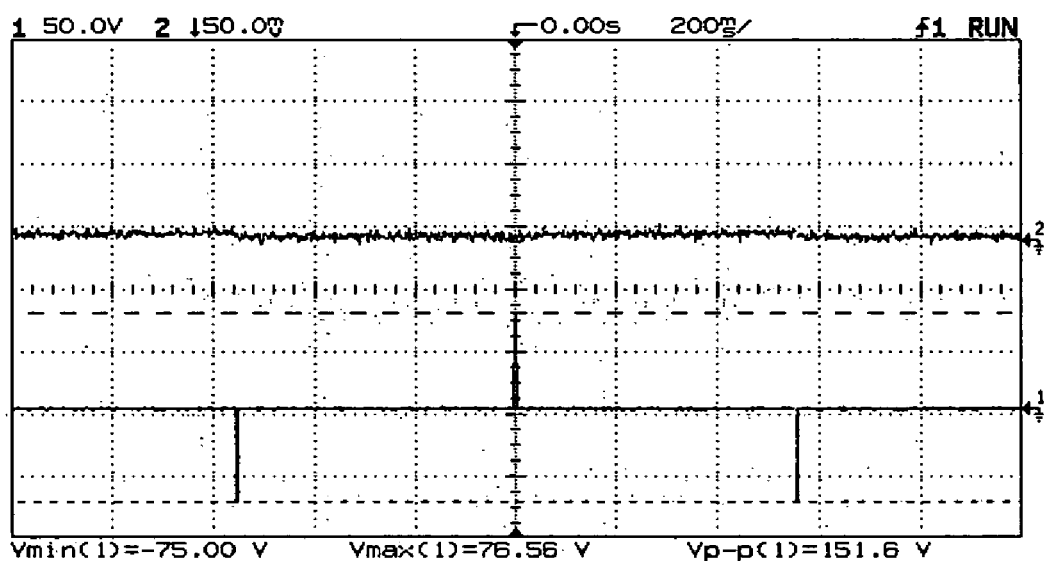

Electro-optic responses of the cell (5 µm spacing) are shown in FIGS. 3a and 3b. In FIG. 3a, pulses of different amplitude produce substantial and stable changes in light transmission when the cell is viewed through crossed polarisers. FIG. 3b illustrates a situation in which pulses of equal amplitude do not produce a change; the cell remains dark because nanoparticles have drifted across the whole cell and stabilised the homeotropic alignment under both pulses. This happens because electromigration of the nanoparticles under an opposite polarity pulse provides fast inversion of the nanoparticles across the cell and in this case new inversed nanoparticles layers close to the surfaces again stabilize the vertical state. The switching was analysed by measurements of contrast Ratio $CR=(IL-ID)/ID$, under a pair of unipolar pulses, where ID is the transmitted light intensity for the dark vertical state, provided by the pulse with constant sufficient parameters, IL—the intensity of transmitted light for the switched state, provided by second pulse with opposite polarity and variable parameters.

Figure 4:
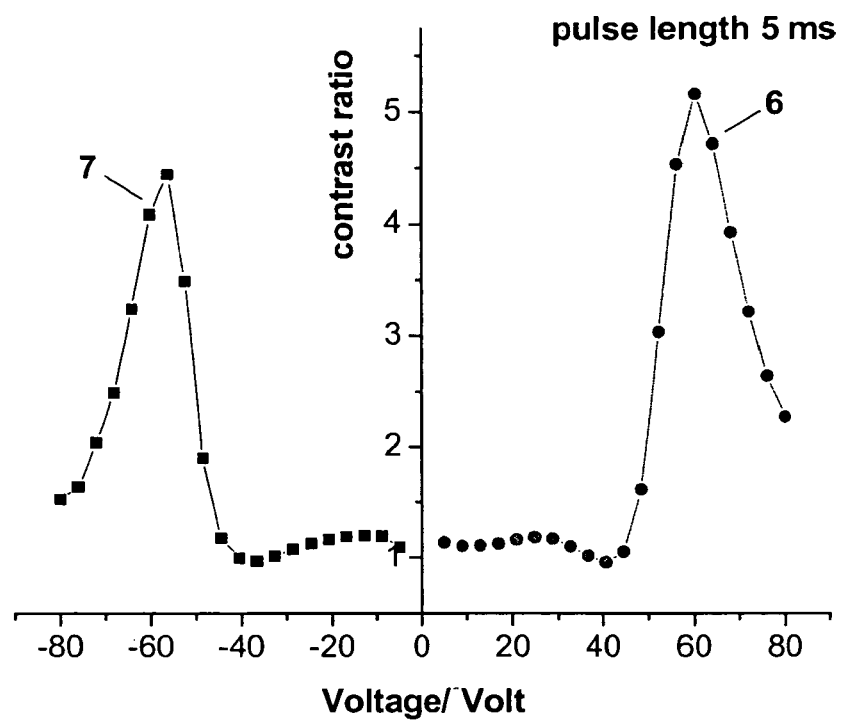
FIG. 4 is a graph showing contrast ratio—v-voltage for a fixed pulse length in a planar cell in accordance with an embodiment of the invention.

For optimised contrast, we have found that a particular voltage range is appropriate for a given pulse length. The shorter the pulse, the higher is the preferred voltage. FIG. 4 shows a case where unipolar pulses of 5 ms duration with opposite polarity are applied to the cell. One curve 6 plots contrast ratio, when the negative pulse with constant parameters 80 V & 5 ms, provides switching to the vertical dark state and a positive pulse with increased amplitudes up to 80 V, provides the opposite switching. The other curve 7 plots contrast ratio when a positive pulse has the same constant parameters, providing switching to the vertical state and negative pulses change amplitudes from −5 to −80 V. The pulse of opposite polarity with increasing voltage provides switching back to the planar state. The maximum contrast ratio is achieved for the amplitude 40-60 V.

Figure 5:
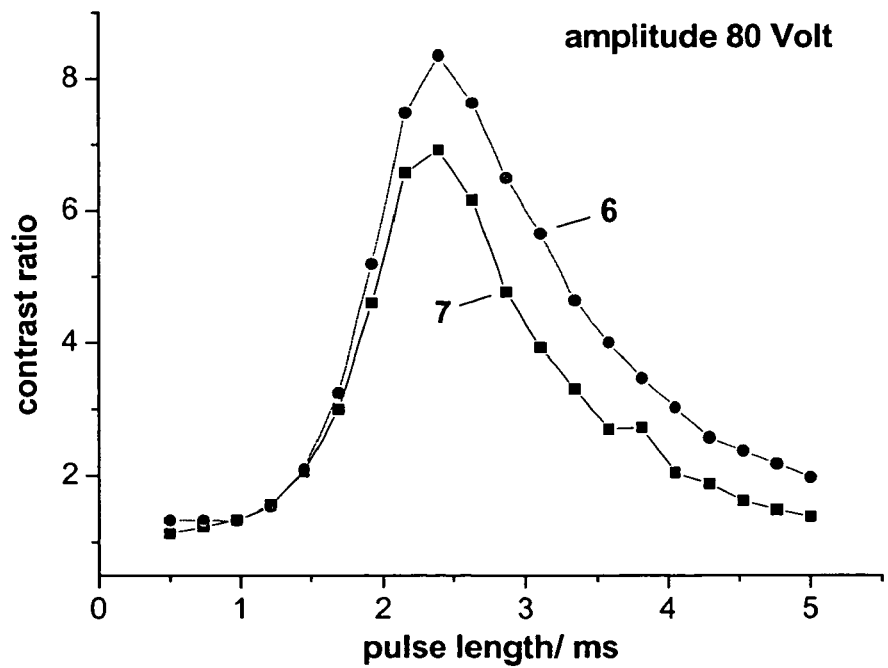
FIG. 5 is graph showing contrast ratio—v-pulse length for a fixed voltage in the cell of FIG. 4.

The same switching is observed when pulse length is changed instead of the amplitude. FIG. 5 shows graphs of contrast ratio against pulse length for a fixed 80 V amplitude. In this case the maximum contrast is achieved for a pulse length of 2-3 ms. Curves 6 and 7 respectively show the switching for reversed polarity of the electrical pulses, when to the cell are applied negative pulses with constant parameters 80 V & 5 ms, providing switching to the vertical state and positive pulses 80 V with varied length 0.5-5 ms, providing back switching (curve 6) and the case of the reversed polarity of the pulses (curve 7). As follows from the graphs the switching character is quite symmetrical.

Turning now to FIGS. 1b-1f, examples are illustrated of different display modes in accordance with aspects of the invention.

Figure 1B:
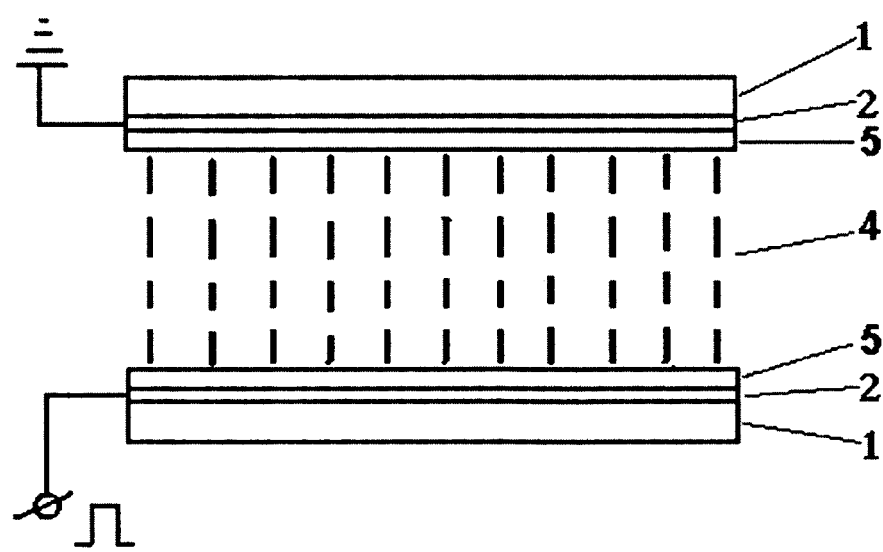

In the cell of FIG. 1b, the inner surface of each cell wall 1 is treated with a homeotropic aligning layer 5, which provides a director alignment substantially perpendicular to the local plane of the cell wall surface. Suitable homeotropic alignments 5 include lecithin or a chrome complex. In this example, the LC is a negative LC material so that it tends to align with the director substantially perpendicular to an applied field. Accordingly, when an electric field is applied to the cell of FIG. 1b, the LC molecules adopt a planar alignment with no well-defined azimuthal direction. When the alignment layers 5 are sufficiently covered with nanoparticles they no longer influence alignment of the LC, which tends to remain in a planar alignment. This tendency may be reinforced by a network of nanoparticles in the LC near the cell wall surfaces.

Figure 6:
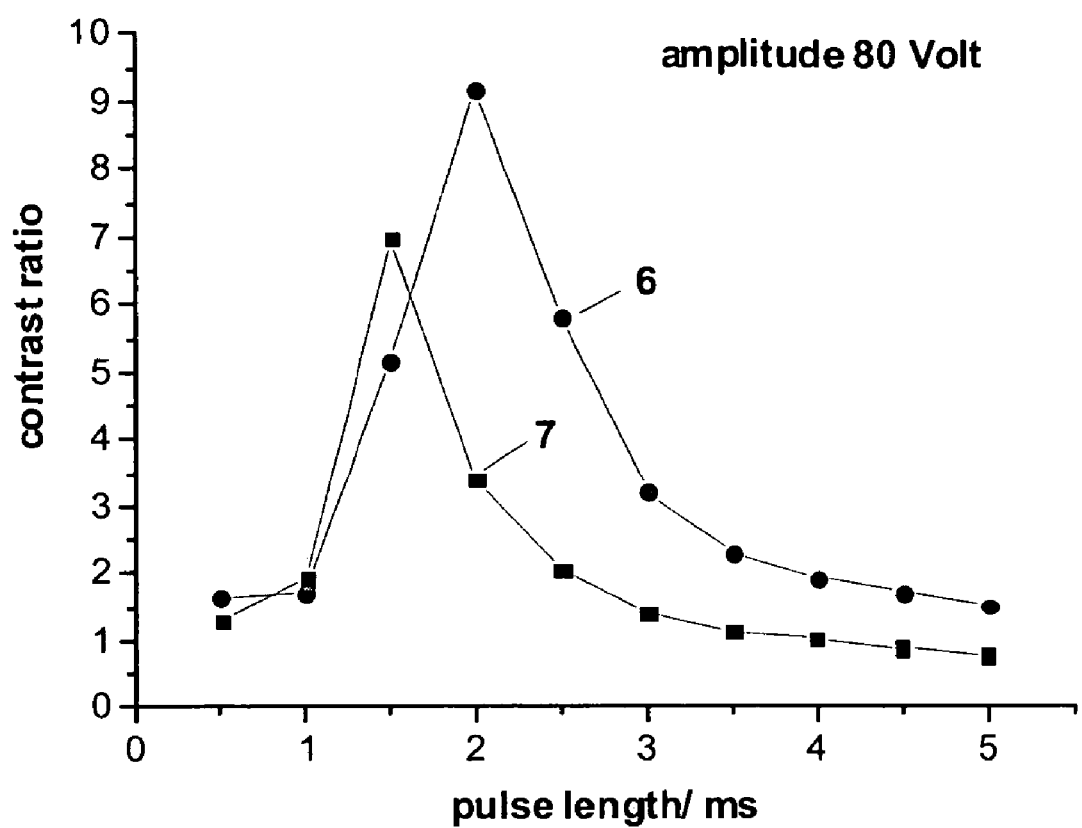
FIG. 6 is a graph showing contrast ratio—v-voltage for a fixed voltage in a homeotropic cell with positively and negatively charged nanoparticles in accordance with an embodiment of the invention.

FIG. 6 shows contrast ratio measurement against pulse length for a 3 µm homeotropic cell filled by negative LC ZLI4788-000 with 0.5% of Aerosil® R812 silica and 0.5% Aerosil® R504 silica. The same measurement method is used as for the planar cell given in FIG. 5 and the switching process is quite similar. It should be noted the homeotropic cell with a negative LC allows switching to occur with only one sign of nanoparticles. In this case the pulse with sufficient amplitude and length will cause the nanoparticles to collect close to one surface and stabilise quasi-planar oriented molecules.

Figure 7:
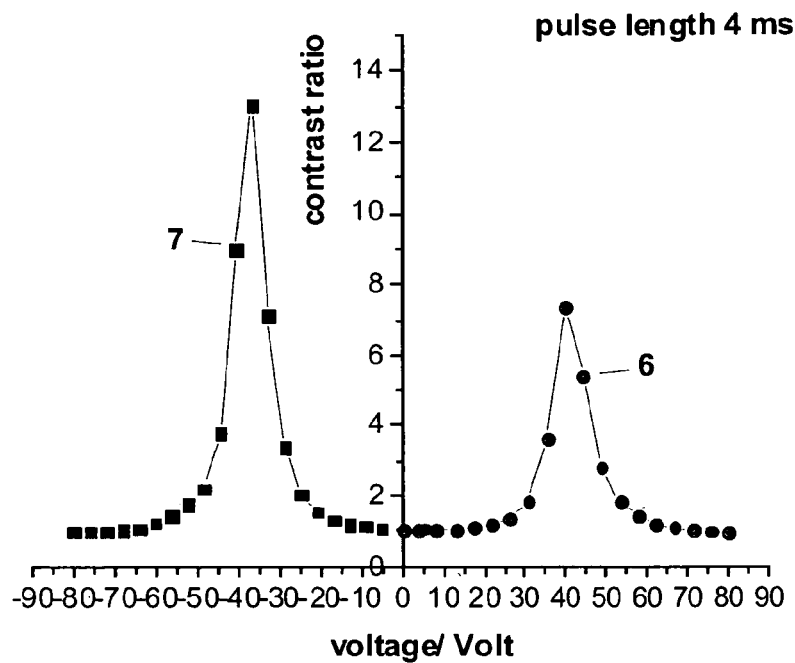
FIG. 7 is a graph showing contrast ratio—v-voltage for a fixed pulse length in a homeotropic cell with one type nanoparticles.
Figure 8:
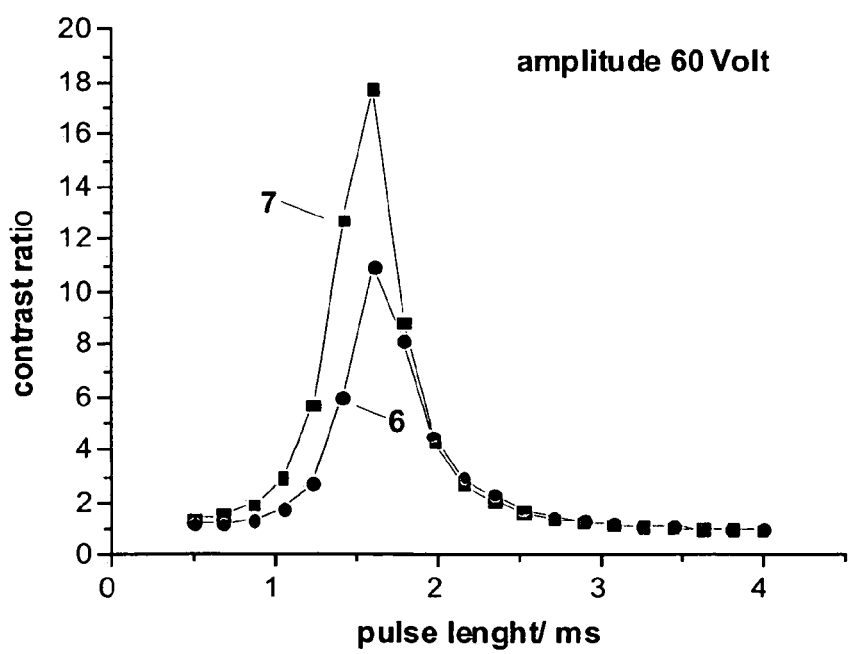
FIG. 8 is graph showing contrast ratio—v-pulse length for a fixed voltage in the cell of FIG. 7.

The opposite polarity pulse with less amplitude or pulse length repels nanoparticles from the surface and provides their distribution into the bulk of the cell. In this case the nanoparticles network will be quite loose, which will not stabilize the planar orientation of the molecules and the cell again adopts the homeotropic state. This is confirmed by FIG. 7 and FIG. 8, which give contrast ratio measurements for the 5 µm homeotropic cell filled by negative LC ZLI4788-000 with 1% of Aerosil® OX50 silica. The same measurement method is used as for the planar cell for which results are given in FIG. 4 and FIG. 5.

Figure 1C:
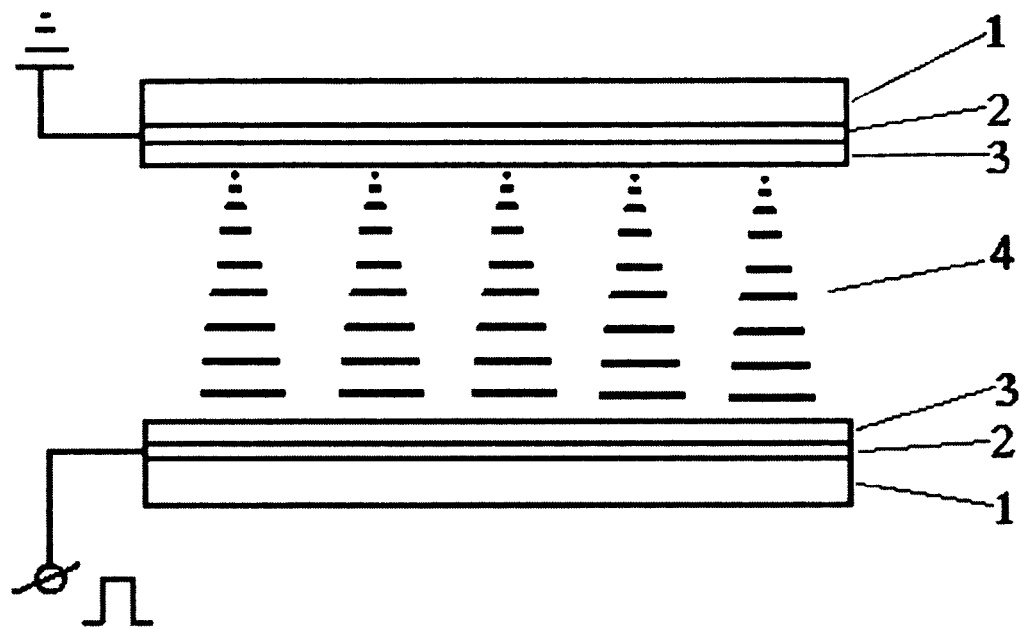

Turning now to FIG. 1c, a twisted nematic (TN) cell is illustrated. Here, the inner surfaces of the cell walls 1 are coated with a planar alignment layer 3, for example rubbed polyimide, with the planar alignment directions normal to one another. The nematic director is locally parallel to the alignment direction at each cell wall 1, and rotates through 90° across the cell. As is well known from conventional TN LCD technology, the cell in this state rotates the plane of polarised light passing through the cell. It therefore appears bright when viewed through crossed polarisers. Application of a suitable DC electric field aligns the positive LC in the composition 4 vertically, and this alignment is stabilised in the absence of a field by the mechanism described previously. This state does not rotate the plane of polarised light, and therefore appears dark through crossed polarisers. The LC could, of course, optionally include a chiral component to provide a greater twist if desired, for example a supertwisted nematic having a twist of 270°.

Figure 9:
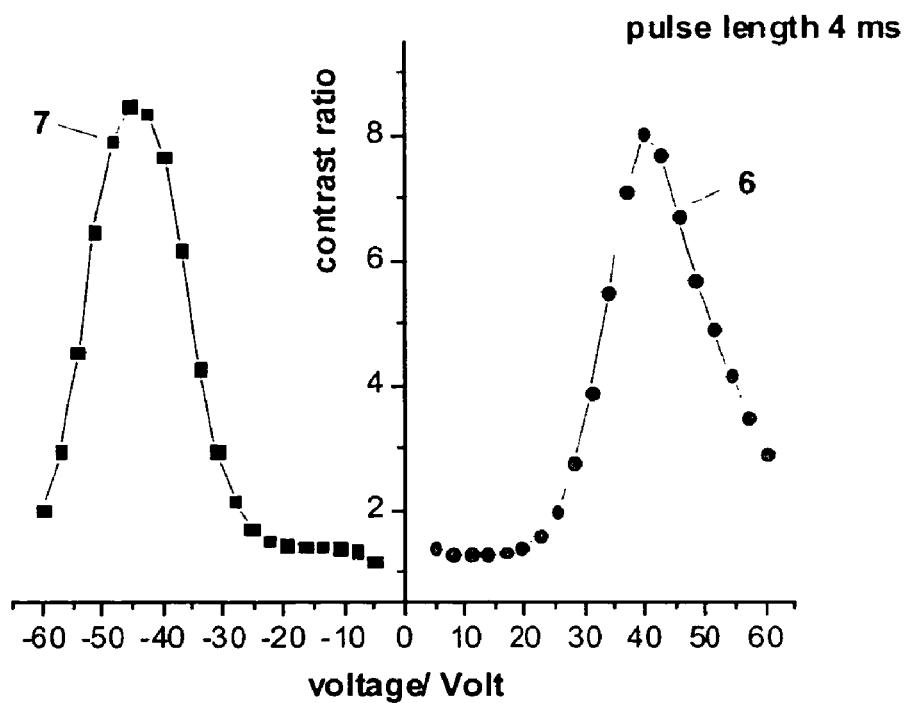
FIG. 9 is a graph showing contrast ratio—v-voltage for a fixed pulse length in a twist cell in accordance with an embodiment of the invention.
Figure 10:
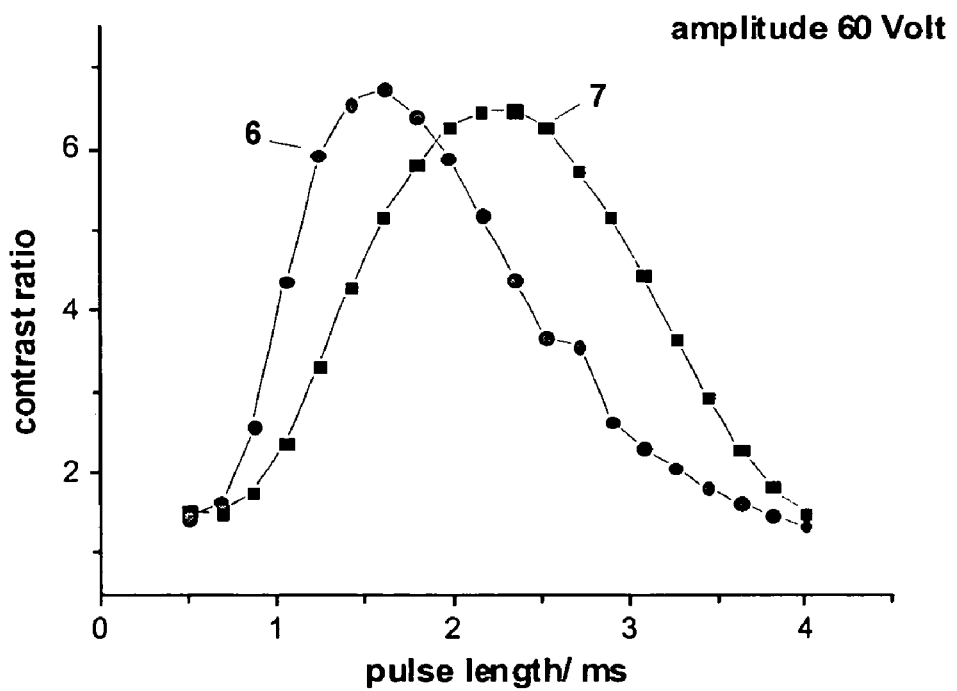
FIG. 10 is graph showing contrast ratio—v-pulse length for a fixed voltage in the cell of FIG. 9.

In FIG. 9 and FIG. 10 are given contrast ratio measurements for the 3 µm twist cell filled by ZLI2293 with 0.5% of aluminium oxide C and 0.5% Aerosil® R202 silica.

The same measurement method was used as for planar cell for which results are given in FIG. 4 and FIG. 5.

Figure 1D:
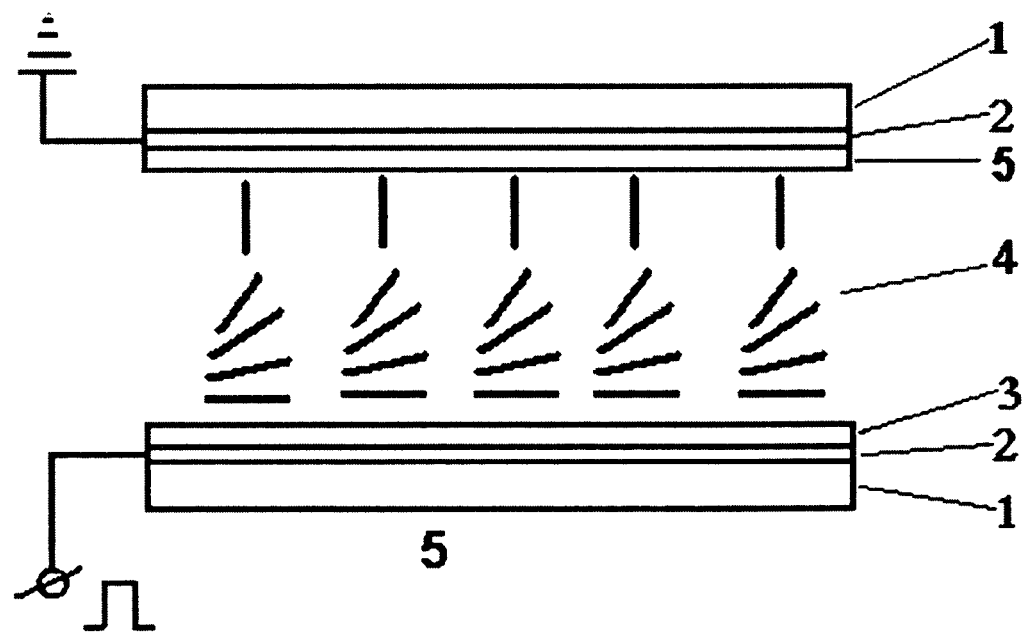

The cell shown in FIG. 1d is a hybrid aligned nematic (HAN) cell. It has one alignment layer 3 that induces local planar alignment and one alignment layer 5, on an opposite surface, which induces homeotropic (vertical) alignment. The cell appears light when viewed through crossed polarisers, but dark when the alignment is vertical throughout the cell. It is to be noted that bistable switching could be achieved by use of only a single type of nanoparticle (either positive or negative) providing that the correct polarity is applied to the electrodes to cause the nanoparticles to stabilise the vertical alignment by covering the planar alignment layer 3. With a mixture of nanoparticles of positive and negative charge, either polarity may be used to stabilise the vertical alignment.

Figure 1E:
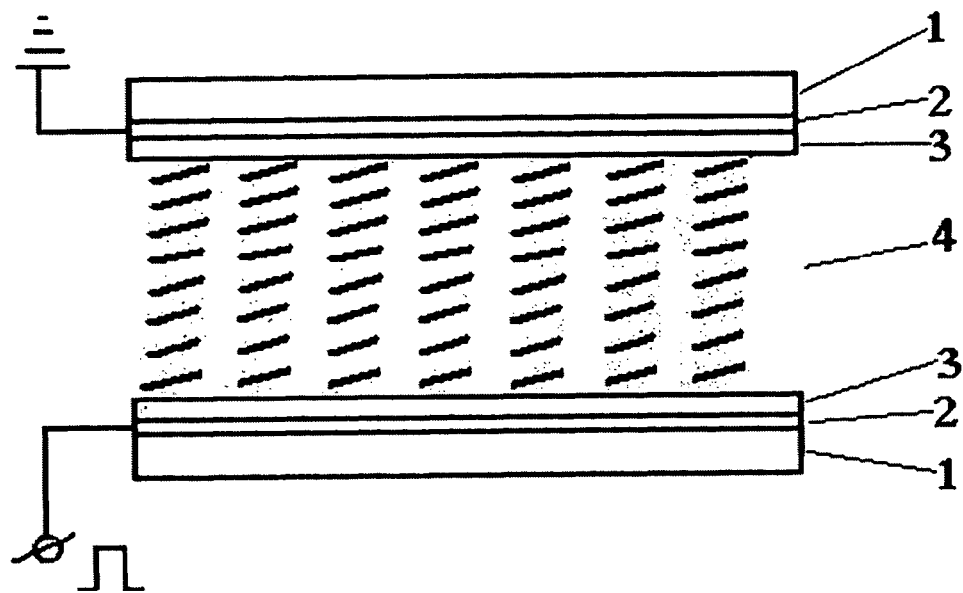
Figure 1F:
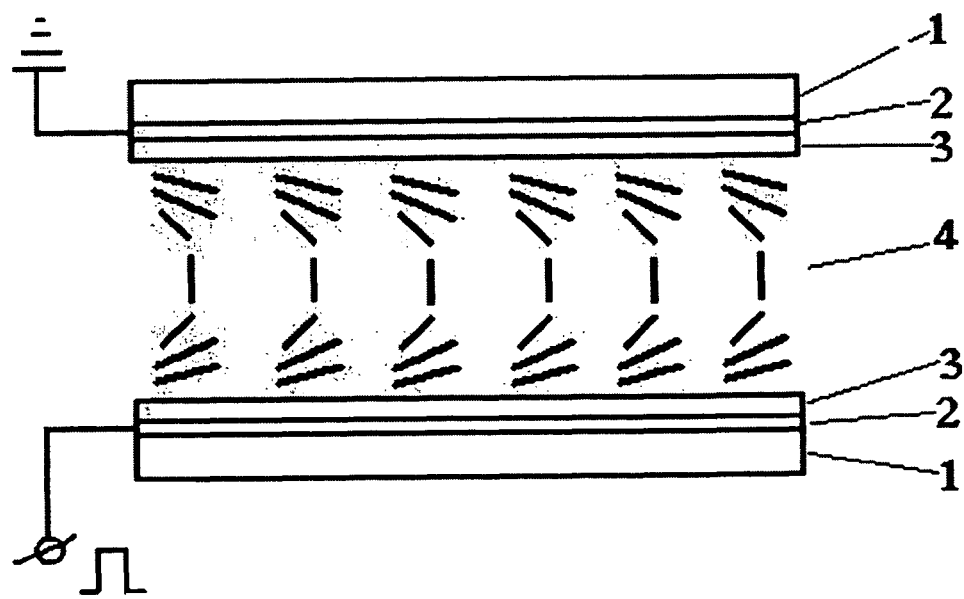

Planar alignment layers 3 typically induce a planar alignment which has a few degrees of pretilt, such as illustrated in FIGS. 1e and 1f. In the cell of FIG. 1e, the pretilt is parallel at each cell wall 1 and the alignment is uniformly tilted and parallel throughout the cell. This cell operates in a simple Fréedericksz mode as described with reference to FIG. 1a. In the cell of FIG. 1f, the pretilt is antiparallel and the display operates as a so-called pi-cell. The cell is bistably switchable between a splay state (in which the orientation is almost horizontal throughout the cell) and a bend state, as illustrated in FIG. 1f.

The use of a mixture of positively- and negatively-charged nanoparticles enables control of switching close to the surface of both cell walls at the same time, by applying a unipolar pulse. This arrangement enables bistable switching in cells with identical surface conditions on both inner surfaces, with the whole cell switching between stable optically-distinguishable states with different molecular orientations. The switching of the whole cell improves optical efficiency and improves viewing angles of cells such as twisted or supertwisted nematic and pi-cell.

Figure 11:
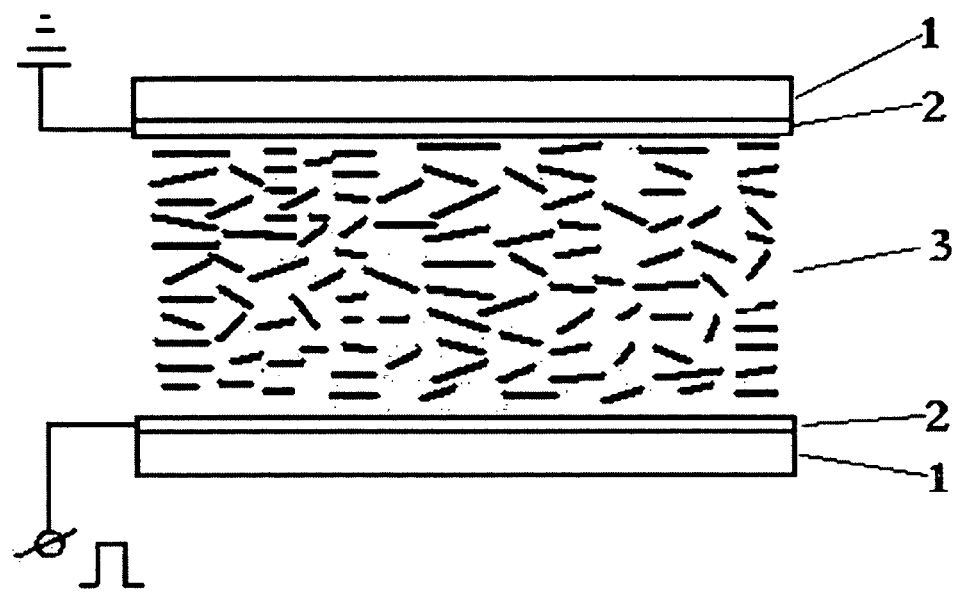
FIG. 11 schematically illustrates a bistable LCD with bare electrodes in accordance with an embodiment of the present invention.

This method of switching controlling provides a bistable switching even in a LC cell with bare electrodes 2, schematically presented in FIG. 11.

Figure 12:
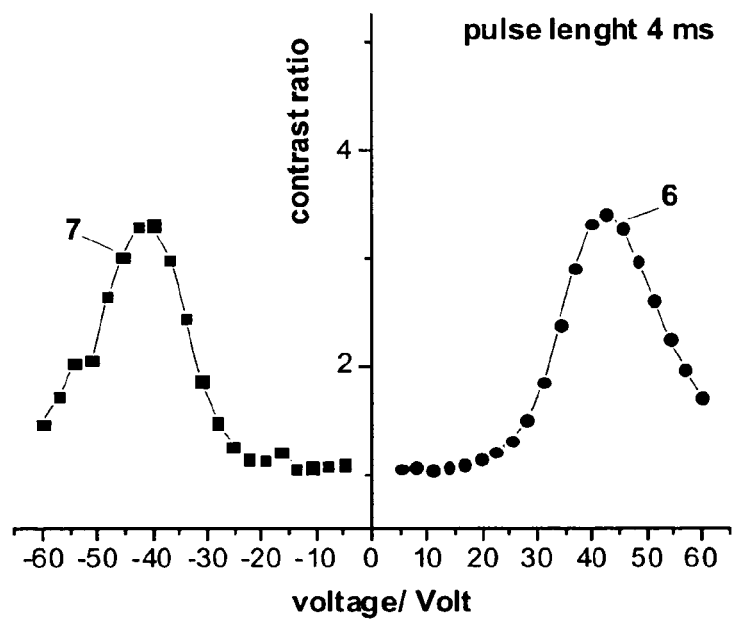
FIG. 12 is a graph showing contrast ratio—v-voltage for a fixed pulse length in a cell with bare electrodes in accordance with an embodiment of the invention.
Figure 13:
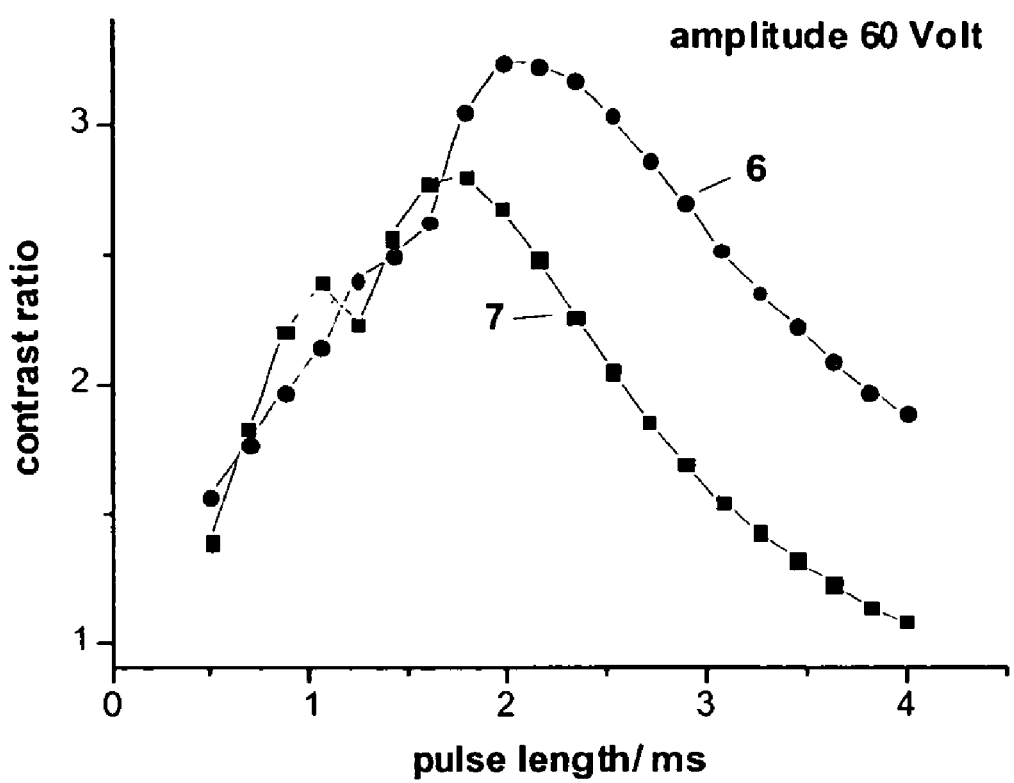
FIG. 13 is graph showing contrast ratio—v-pulse length for a fixed voltage in the cell of FIG. 12.

In FIG. 12 and FIG. 13 are given contrast ratio measurement for a 5 µm LC cell with bare ITO electrodes filled by LC E63 with 1% of aluminium oxide C and 1% Aerosil® R812 silica. The same measurement method is used as for the planar cell for which results are given in FIG. 4 and FIG. 5, and the cell shows quite similar behaviour. Of course, for avoiding some short-circuiting between electrodes it may be desirable to use some thin covering layer over the electrode, for example thin non-oriented polyimide.

Various commercial nematic LCs from Merck have been used in the present invention, including: E7,E63, ZLI2293, MLC6440, MLC6023-000, dye-doped nematics ZLI3752, ZLI4756 (all with positive dielectric anisotropy) and ZLI4788-000, dye-doped ZLI6092/1 (with negative dielectric anisotropy). Many other suitable LCs will be known to those skilled in the art of LCD manufacture. These LCs were doped with fumed silica or aluminium oxide. The negatively-charged nanoparticles were (silica) Aerosil® R974, R972, R812, R711, R380, R202, R816, OX50 with primary size 7-40 nm and positively-charged silica R504 (7 nm), aluminium oxide C (13 nm) (all from Degussa-Huls). The concentration of the particles in the LC varied between 0.5 and 15%, with equal weights of positive and negative nanoparticles. Cell spacings have been varied from 1.6-25 μm using spacer means, for example polymer beads of appropriate diameter. Cell walls (substrates) have been constructed of glass and transparent plastics materials.

It is appreciated that certain features of the invention, which are for clarity described in the context of separate embodiments, may also be provided in combination in a single embodiment. Conversely, various features of the invention which are, for the sake of brevity, described in the context of a single embodiment, may also be provided separately or in any suitable subcombination.

It is to be recognized that various alterations, modifications, and/or additions may be introduced into the constructions and arrangements of parts described above without departing from the spirit and scope of the present invention as specified in the accompanying claims.

What is claimed is:

1. A bistable nematic liquid crystal display device switchable between a first homeotropic stable molecular configuration and a second stable non-homeotropic molecular configuration, the bistable nematic liquid crystal display comprising:
   a liquid crystal material doped with a mixture of finely-divided positively-charged nanoparticles and finely-divided negatively-charged nanoparticles,
   the liquid crystal material to adopt the first stable homeotropic molecular configuration in response to a first pulse of a unidirectional electric field of suitable magnitude and duration and to adopt the second stable non-homeotropic molecular configuration in response to a second pulse of unidirectional electric field of suitable magnitude and duration and opposite polarity to said first pulse,
   in the first stable homeotropic molecular configuration the positively-charged nanoparticles being substantially migrated to respective cell walls to shield the liquid crystal material from a surface alignment, and
   in the second stable non-homeotropic molecular configuration the positively-charged and the negatively-charged nanoparticles being dispersed in the liquid crystal material to expose the liquid crystal material to the surface alignment.

2. A device according to claim 1, wherein the nanoparticles have a size in the range 1 to 1000 nm.

3. A device according to claim 1, wherein the nanoparticles have a size in the range 5 to 50 nm.

4. A device according to any preceding claim, wherein the charged nanoparticles comprise at least one of silica or alumina.

5. A device according to claim 1, wherein the nanoparticles are present in a concentration of from 0.1% to 25% by weight of composition.

6. A device according to claim 1, wherein the nanoparticles are present in a concentration of from 0.5% to 15% by weight of composition.

7. A bistable liquid crystal display device comprising:
   at least two cell walls, at least one of the cell walls being translucent;
   a nematic liquid crystal material doped with finely-divided solid nanoparticles; and
   at least one electrode on an inner surface of respective ones of the at least two cell walls to apply electric fields across at least some of the nematic liquid crystal material,
   the finely-divided solid nanoparticles comprising a mixture of positively-charged nanoparticles and negatively-charged nanoparticles,
   the nematic liquid crystal material to adopt a first stable homeotropic molecular configuration in response to a first pulse of a unidirectional electric field of suitable magnitude and duration and to adopt a second stable non-homeotropic molecular configuration in response to a second pulse of unidirectional electric field of suitable magnitude and duration and opposite polarity to the first pulse,
   in the first stable homeotropic molecular configuration the positively-charged nanoparticles being substantially migrated to a first of the cell walls and the negatively-charged nanoparticles being substantially migrated to a second of the cell walls to shield the liquid crystal material from a surface alignment, and
   in the second stable non-homeotropic molecular configuration the positively-charged and the negatively-charged nanoparticles being dispersed in the liquid crystal material to expose the liquid crystal material to the surface alignment.

8. A device according to claim 7, wherein the nanoparticles have a size in the range 1 to 1000 nm.

9. A device according to claim 7, wherein the nanoparticles have a size in the range 5 to 50 nm.

10. A device according to claim 7, wherein the liquid crystal material has a negative dielectric anisotropy.

11. A device according to claim 7, wherein the nanoparticles are present in a concentration of from 0.1% to 25% by weight.

12. A device according to claim 7, wherein the nanoparticles are present in a concentration of from 0.5% to 15% by weight.

13. A device according to claim 7, wherein a first weight of the positively-charged nanoparticles is substantially equal to a second weight of the negatively-charged nanoparticles.

14. A bistable liquid crystal display device comprising:
   at least two cell walls, at least one of the cell walls being translucent; said
   a layer of nematic liquid crystal material doped with finely-divided nanoparticles, the particles comprising a mixture of positively-charged nanoparticles and negatively-charged nanoparticles and having sizes in a range of 1 to 500 nm;
   at least one electrode on inner surfaces of respective ones of the cell walls to apply an electric field across at least some of the liquid crystal material;
   a first surface alignment on the inner surface of one cell wall to induce adjacent molecules of the liquid crystal material to adopt a first orientation; and a second surface alignment on the inner surface of the other cell wall to induce adjacent molecules of the liquid crystal to adopt a second orientation, liquid crystal material to adopt a first stable homeotropic molecular configuration in response to a first pulse of a unidirectional electric field of suitable magnitude and duration and to adopt a second stable non-homeotropic molecular configuration in response to a second pulse of unidirectional electric field of suitable magnitude and duration and opposite polarity to said first pulse, in the first stable homeotropic molecular configuration, the positively-charged nanoparticles being substantially migrated to a first of the cell walls and the negatively-charged nanoparticles being substantially migrated to a second of the cell walls, and in the second stable non-homeotropic molecular configuration, the positively-charged and the negatively-charged nanoparticles being dispersed in the liquid crystal material.

15. A device according to claim 14, wherein the first surface alignment and the second surface alignment induce a local planar alignment in the adjacent molecules of the liquid crystal material.

16. A bistable liquid crystal display device comprising:
    translucent cell walls;
    nematic liquid crystal material doped with finely-divided nanoparticles, the nanoparticles comprising a mixture of positively-charged nanoparticles and negatively-charged nanoparticles and having sizes in the range 1 to 1000 nm;
    electrodes on inner surfaces of the cell walls to apply an electric field across at least some of the liquid crystal material;
    a first surface alignment on the inner surface of a first one of the cell walls to induce adjacent molecules of the liquid crystal material to adopt a first orientation; and
    a second surface alignment on the inner surface of a second one of the cell walls to induce adjacent molecules of the liquid crystal to adopt a second orientation,
    the liquid crystal material switchable to a first stable molecular configuration by the application of a first electric field of suitable strength and duration to move the charged nanoparticles to respective surface alignments to substantially prevent the surface alignments from influencing alignment of the adjacent molecules of the liquid crystal material, and
    the liquid crystal material switchable from the first configuration to a second stable non-homeotropic molecular configuration by the application of a second electric field of suitable strength and duration and opposite polarity to the first electric field to move a sufficient number of the charged nanoparticles away from the surface alignments to permit the surface alignments to influence the alignment of the molecules of the liquid crystal when the second electric field is removed.

17. A device according to claim 16, wherein the surface alignments induce a planar alignment.

18. A device according to claim 16, wherein the surface alignments induce the homeotropic alignment and the liquid crystal material has a negative dielectric anisotropy.

* * * * *